US009677018B2

(12) United States Patent
Rieger et al.

(10) Patent No.: US 9,677,018 B2
(45) Date of Patent: Jun. 13, 2017

(54) PROCESS FOR THE PRODUCTION OF SYNTHESIS GAS FROM HARD COAL

(71) Applicant: THYSSENKRUPP INDUSTRIAL SOLUTIONS AG, Essen (DE)

(72) Inventors: Michael Rieger, Dortmund (DE); Jan Schöneberger, Dortmund (DE); Holger Thielert, Dortmund (DE)

(73) Assignee: ThyssenKrupp Industrial Solutions AG, Essen (DE)

( * ) Notice: Subject to any disclaimer, the term of this patent is extended or adjusted under 35 U.S.C. 154(b) by 12 days.

(21) Appl. No.: 14/760,117

(22) PCT Filed: Jan. 8, 2014

(86) PCT No.: PCT/EP2014/050190
§ 371 (c)(1),
(2) Date: Jul. 9, 2015

(87) PCT Pub. No.: WO2014/108423
PCT Pub. Date: Jul. 17, 2014

(65) Prior Publication Data
US 2015/0344795 A1    Dec. 3, 2015

(30) Foreign Application Priority Data

Jan. 9, 2013  (DE) .......... 10 2013 010 173
Jun. 3, 2013  (DE) .......... 10 2013 010 473
Jun. 6, 2013  (DE) .......... 10 2013 009 885

(51) Int. Cl.
| | |
|---|---|
| C10K 1/34 | (2006.01) |
| C10B 53/04 | (2006.01) |
| C10K 1/00 | (2006.01) |
| C01B 17/16 | (2006.01) |
| C10B 53/00 | (2006.01) |
| B01J 23/882 | (2006.01) |
| B01J 35/10 | (2006.01) |
| C10L 3/08 | (2006.01) |

(52) U.S. Cl.
CPC .......... *C10K 1/004* (2013.01); *C01B 17/165* (2013.01); *C10K 1/34* (2013.01); *B01J 23/882* (2013.01); *B01J 35/108* (2013.01); *B01J 35/1042* (2013.01); *C10B 53/00* (2013.01); *C10B 53/04* (2013.01); *C10L 3/08* (2013.01)

(58) Field of Classification Search
CPC .......... C10K 1/004; C10K 1/003; C10K 1/34; C01B 17/165; C10B 53/04; C10B 53/00; B01J 23/882; B01J 35/1042; B01J 35/108
See application file for complete search history.

(56) References Cited

U.S. PATENT DOCUMENTS

| | | | |
|---|---|---|---|
| 4,085,199 A | 4/1978 | Singleton et al. | |
| 4,175,928 A * | 11/1979 | Britton ............ | C01B 3/58 |
| | | | 423/230 |
| 4,336,233 A | 6/1982 | Appl et al. | |
| 4,456,700 A * | 6/1984 | Oleck .............. | B01J 23/88 |
| | | | 502/220 |
| 4,863,489 A | 9/1989 | Suggitt | |
| 4,981,661 A * | 1/1991 | Borsboom ....... | C01B 3/48 |
| | | | 423/230 |
| 2002/0121093 A1* | 9/2002 | Wallace .......... | C10K 1/34 |
| | | | 60/780 |
| 2006/0051263 A1* | 3/2006 | Harada ............ | B01D 53/885 |
| | | | 422/211 |
| 2010/0284879 A1* | 11/2010 | Nedez ............. | B01D 53/8603 |
| | | | 423/244.02 |
| 2012/0148468 A1* | 6/2012 | Massie ............ | B01D 53/8603 |
| | | | 423/244.1 |
| 2013/0303811 A1* | 11/2013 | Roisin ............ | B01D 53/8603 |
| | | | 585/251 |
| 2014/0069011 A1* | 3/2014 | Yoon .............. | C10K 3/001 |
| | | | 48/128 |
| 2016/0032201 A1* | 2/2016 | Kato .............. | C10K 1/34 |
| | | | 252/373 |

FOREIGN PATENT DOCUMENTS

| | | | | |
|---|---|---|---|---|
| CN | 101050389 A | 10/2007 | | |
| CN | 100376313 C | 3/2008 | | |
| DE | 2647690 A1 | 7/1977 | | |
| EP | 2412667 A1 | 2/2012 | | |
| FR | 2122407 A1 * | 9/1972 | ......... | C01B 17/165 |
| GB | 601320 A * | 5/1948 | ......... | C10K 1/34 |

(Continued)

OTHER PUBLICATIONS

PCT Application No. PCT/EP2014/050190, International Search Report and Written Opinion dated Jun. 3, 2014.
Translation of Chinese Application No. 20140004324.0 Office Action dated Jun. 21, 2016, 11 pages.
Translation of EP Application No. 14 702 755.1, Office Action dated Aug. 4, 2016, 9 pages.

Primary Examiner — Timothy Vanoy
(74) Attorney, Agent, or Firm — Lathrop & Gage L.L.P.

(57) ABSTRACT

A process for the production of synthesis gas from coke is described herein. The process comprises the steps of: (a) subjecting hard coal to dry pyrolysis, resulting in the production of a gas mixture containing hydrogen, methane, nitrogen and carbon monoxide as major constituents and carbon sulphides as minor constituents; (b) subjecting the gas mixture to hydrogenation at a temperature in the range of 200 to 280° C. over a sulphidic cobalt molybdenum catalyst provided on an aluminium oxide carrier material; and (c) separating the hydrogen sulphide obtained from hydrogenation from the gas mixture.

20 Claims, No Drawings

(56) References Cited

FOREIGN PATENT DOCUMENTS

| | | | |
|---|---|---|---|
| GB | 1018630 | A | 1/1966 |
| GB | 1332337 | A | 10/1973 |
| GB | 1404581 | A | 9/1975 |
| WO | 9316184 | A1 | 8/1993 |
| WO | 2004105922 | A1 | 12/2004 |

* cited by examiner

PROCESS FOR THE PRODUCTION OF SYNTHESIS GAS FROM HARD COAL

CROSS-REFERENCE TO RELATED APPLICATIONS

This application is the national stage entry of International Patent Application No. PCT/EP2014/050190, filed Jan. 8, 2014, which designated the United States, and which claims priority to German Patent Application No. DE 102013000173.0, filed Jan. 9, 2013, German Patent Application No. DE 10201301473.4, filed Jun. 3, 2013, and German Patent Application No. DE 102013009885.8, filed Jun. 6, 2013. Each of these documents are incorporated by reference herein in their entireties.

BACKGROUND

1. Field of the invention

The invention belongs to the field of coke making technology and relates to a new process for the removal of carbon sulphides from coke oven gas and to a new catalyst and its application.

2. State of the art

Coke oven gas (synonym: coking gas) is obtained from dry distillation of hard coal in coke oven plants. As main constituents, the gas typically contains approx. 55%-wt hydrogen, 25%-wt methane, 10%-wt nitrogen, and 5%-wt. carbon monoxide. Due to this, coke oven gas is generally qualified as a synthesis gas for chemical reactions. Disadvantageous, however, are the contents of carbonyl sulphide and carbon disulphide, which must previously be removed as they act as catalyst poisons in subsequent reactions, for example. The consequence is that the catalysts must frequently be cleaned or even exchanged, which directly involves effort and cost and is also unwanted because of the turnaround of the plant.

One method to free coke oven gas from unwanted carbon sulphides is to subject the gas to a catalytic hydrogenation and to convert the sulphur compounds into hydrogen sulphide. Although this gas is also unwanted, it can be washed out easily by means of aqueous lye, for example, ammonia solution.

Related processes are already known according to prior art. German patent application DE 1545470 A1 (Pichler), for example, suggests to hydrogenate carbon sulphides over cobalt molybdenum, nickel molybdenum or nickel cobalt molybdenum catalysts to hydrogen sulphide, which is then to be separated. The reaction temperature in the examples is above 550° C.

The use of catalysts on a nickel, cobalt, molybdenum or palladium basis for the hydrodesulphurisation of coke oven gas can also be found in various older Japanese patent applications, as, for instance, JP 59 145288 A2 (Shinnittetsu) or JP 59 230092 A1 (Hitachi).

A similar process is also known from German patent application DE 2647690 A1 (Parsons), which proposes to hydrogenate sulphur-bearing carbon compounds over catalysts on the basis of cobalt, molybdenum, iron, chromium, vanadium, thorium, nickel, tungsten and/or uranium and to remove the hydrogen sulphide obtained in an extraction column by means of an alkali hydroxide solution. The sulphides of the above metals are proposed as concrete catalysts. A disadvantage involved is, however, that in this case as well the catalysts require a minimum temperature of 260° C. and the hydrogenation must preferably be carried out at significantly higher temperatures, partly even above 400° C. This is not desired especially for reasons of energy cost. In addition, such temperatures will change the composition of the gas, i.e. methanation will take place already.

Although prior-art processes serve to transform carbon sulphides to hydrogen sulphide at high yields and to thus convert coke oven gases into synthesis gases of sufficiently high quality, they all involve the substantial disadvantage that these processes must take place at very high temperatures of considerably more than 280° C., as otherwise no adequate conversion rates will be achieved.

SUMMARY

Disclosed herein is a process for the production of synthesis gas from hard coal which may improve the existing processes in so far as the carbon sulphides and organic sulphur compounds (e.g. thiophenes), if any, are transformed virtually quantitatively to hydrogen sulphide but at temperatures which are significantly lower. Furthermore, the process may aid in ensuring that the mass ratio of carbon oxides to methane unchanged, i.e. preventing methanation.

DESCRIPTION OF THE INVENTION

A process for the production of synthesis gas from coke is disclosed herein, in which:
(a) hard coal is subjected to dry pyrolysis, resulting in the production of a gas mixture containing hydrogen, methane, nitrogen and carbon monoxide as major constituents and carbon sulphides as minor constituents,
(b) the gas mixture is subjected to hydrogenation at a temperature in the range of 200 to 280° C. over a sulphidic cobalt molybdenum catalyst provided on an aluminium oxide carrier material, and
(c) the hydrogen sulphide obtained from hydrogenation is separated from the gas mixture.

Surprisingly it was found that the sulphidic cobalt molybdenum catalysts known for hydrogenation of carbon sulphides feature a high activity and selectivity even below 280 and preferably below 260° C. if they are deposited on aluminium oxide carrier material. Carbon sulphides are actually hydrogenated to hydrogen sulphide at at least 95%-vol. without observing an influence of the hydrogenation on the ratio of carbon oxides to methane. This is an unexpected result, as on account of the experience according to document DE 2647690 A1, one would have expected that catalysts which mainly contain cobalt and molybdenum in sulphidic form also facilitate unwanted methanation to a non-negligible degree, especially if the reaction is performed, as usual, under pressure.

Production of Coking Gas by Pyrolysis of Hard Coal

During dry distillation or pyrolysis of hard coal, which takes place at 900 to 1400° C., the volatile constituents of the coal are released and porous coke forms, which now essentially contain only carbon. By fractionated condensation the raw gas is decomposed into tar, sulphuric acid, ammonia, naphthalene, benzene and the so-called coking gas. The latter is composed of hydrogen, methane, nitrogen and carbon oxides and may, after adequate treatment to obtain synthesis gas, be used for further chemical reactions.

Hydrogenation Process

Hydrogenation of the pyrolysis gases may be done in the customary manner , for which mainly fixed-bed reactors have proved best suited, as the catalysts are provided in the form of lumps as bulk layer or fixed packing. Since bulk material leads to channelling more easily and hence to an inhomogeneous flow distribution, preference is given to the embodiment in which the catalysts are arranged in packings inside the reactor.

One advantage of the hydrogenation in the fixed-bed reactor is that high space/time yields can be achieved, which is why the process according to the invention can also be carried out at high gas hourly space velocity (GSHV) values of approx. 500 to approx. 1500 and preferably approx. 1000 to approx. 1200 l/h. Another advantage is provided in that no special measures are required for the product discharge, as the reactants—i.e. pyrolysis gas and hydrogen—are preferably introduced jointly at the bottom of the reactor, pass through the catalyst bed leading to hydrogenation, and leave the reactor as products at the top.

And as already mentioned at the beginning, another advantage of the process is that the sulphur compounds are hydrogenated over the catalysts to be used so that the reaction is possible at significantly more moderate conditions and effects the complete conversion of the carbon sulphides, without any signs of methanation. The reaction temperature ranges between 200 and 280 and with regard to an adequate reaction velocity preferably between 240 and 260° C. The reactor may be heated from the outside—which results in a higher energy consumption—or the reaction components may be heated before introducing them into the reactor, with the mixing being possibly done in a nozzle which works, for example, by the Venturi principle.

Furthermore, the reaction may take place in the range of 1 to 15 bar, i.e. at atmospheric pressure or under pressure. Preference may be given to an embodiment which uses a pressure in the range of approx. 5 to approx. 10 bar, as this may be of benefit to yield and reaction velocity.

Catalysts
Sulphidic Cobalt Molybdenum Catalysts

The term 'sulphidic cobalt molybdenum catalysts' mainly refers to catalysts which contain molybdenum sulphide as the actual catalyst and cobalt as the promoter. Catalysts of that kind are produced in known manner by joint sulphidation of the respective oxides, where the $MoO_3$ is converted completely to $MoS_2$. When the latter is applied to the aluminium oxide carrier, it is either bonded flat to the surface (basal bonding) or to one edge only ('edge bonding'). After sulphidation the cobalt is available in three forms: first as $Co_9S_8$ crystals deposited on the carrier, as $Co^{2+}$ ions on the edges of the $MoS_2$ plates ('CoMo phase') and as $Co^{2+}$ ions on the tetrahedral positions in the aluminium oxide lattice. The preferred catalysts are hence composed predominantly, i.e. of more than 50%-mole, preferably of more than 70%-mole and most preferably of more than 90%-mole, of molybdenum sulphide and contain the cobalt in sulphidic form as a promoter, the quantity in %-mole resulting as the difference to 100. From this it follows that in a likewise preferred embodiment the catalysts do not contain any other metals, especially no other transition metals.

Aluminium Oxide Carrier

Aluminium oxides of especially high specific surface area come into consideration as suitable carriers for the sulphidic cobalt molybdenum catalysts, the aluminium oxides preferably featuring the following characteristics:

minimum $V_{37.4}$ of 75 ml/100 g, preferably 80 ml/100 g and most preferably 85 ml/100 g;

maximum $V_{0.1\ \mu m}$ of 31 ml/100 g, preferably 25 ml/100 g and most preferably 15 ml/100 gM;

maximum $V_{0.2\ \mu m}$ of 20 ml/100 g, preferably 15 ml/100 g and most preferably 10 ml/100 g; and ratio of $V_{0.1\ \mu m}$ to $V_{0.2\ \mu m}$ of at least 1.5.

Aluminium oxide carriers of the type mentioned are sufficiently known from the state of the art. European patent documents EP 1385786 B1 and EP 1385787 B1 (Axens), for example, describe a process for their manufacture, in which a hydrargillite-type aluminium oxide is ground, undergoes hydrothermal treatment with an aqueous solution of aluminium nitrate and formic acid at 200° C. for 6 hours, the resulting product then being calcined at 400 to 1300. The carrier material is then extruded and is thus ready for loading. As far as the nature and manufacture of the catalyst carriers is concerned, the two documents mentioned are incorporated by reference herein.

Purification

The hydrogenation products leaving the reactor, particularly the fixed-bed reactor, now contain the sulphur compounds in the form of hydrogen sulphide, the content being typically within the range of 50 to 300 ppm. The presence of $H_2S$ is just as undesirable as that of the carbon sulphides but, in contrast to the latter, hydrogen sulphide can be washed out comparatively easily and, above all, quantitatively. The hydrogenation gases are, for this purpose, preferably passed through an absorption column, where they are treated, for example, in counter current with an aqueous base such as caustic soda or ammonia. Alternatively, other devices may be used for the purification of gases as, for example, venturi scrubbers.

When the $H_2S$ portions have been separated, the purified product is available without restriction as a high-quality synthesis gas for further chemical reactions.

INDUSTRIAL APPLICABILITY

Another embodiment of the invention relates to the use of sulphidic cobalt molybdenum catalysts provided on aluminium oxide carriers for the hydrogenation of carbon sulphides to hydrogen sulphide. For this, preferably such cobalt molybdenum catalysts are used that, with reference to the metal components, predominantly consist of molybdenum sulphide and contain cobalt sulphide as a promoter only.

Also preferred as carriers for the cobalt molybdenum catalysts are aluminium oxides that feature a high specific surface area and at the same time feature the following characteristics:

(i) minimum $V_{37.4}$ of 75 ml/100 g, preferably 80 ml/100 g and most preferably 85 Ml/100 g;

(ii) maximum $V_{0.1\ \mu m}$ of 31 ml/100 g, preferably 25 ml/100 g and most preferably 15 ml/100 gM;

(iii) maximum $V_{0.2\ \mu m}$ of 20 ml/100 g, preferably 15 ml/100 g and most preferably 10 ml/100 g; and (iv) ratio of $V_{0.1\ \mu m}$ to $V_{0.2\ \mu m}$ of at least 1.5.

The present invention also encompasses a method for preparing hydrogen sulphide, wherein carbon sulphides are subjected to hydrogenation in the presence of a working amount of sulphidic cobalt molybdenum catalysts provided on aluminium oxide carriers.

Preferably carbon sulphides are subjected to hydrogenation in the presence of cobalt molybdenum catalysts which, with reference to the metal components, predominantly consist of molybdenum sulphide and contain cobalt sulphide as a promoter only. Also preferred are aluminium oxide carriers meeting the following characteristics:

(i) minimum $V_{37.4}$ of at least 75 ml/100 g, preferably 80 ml/100 g and most preferably 85 ml/100 g;

(ii) maximum $V_{0.1\ \mu m}$ of 31 ml/100 g, preferably 25 ml/100 g and most preferably 15 ml/100 gM;

(iii) maximum $V_{0.2\ \mu m}$ of 20 ml/100 g, preferably 15 ml/100 g and most preferably 10 ml/100 g; and (iv) ratio of $V_{0.1\ \mu m}$ to $V_{0.2\ \mu m}$ of at least 1.5.

The invention may be further understood by way of the following example:

EXAMPLE 1

A pilot plant for fixed-bed hydrogenation was equipped with a bulk layer of commercially available lumpy sulphidic cobalt molybdenum catalyst on an aluminium oxide carrier. Subsequently, different coking gases were introduced at the bottom of the column. The only difference between these so-called feed gases was the amount of carbon sulphides, in particular carbon disulphide. The hydrogenation was performed at a temperature of 220° C. and a pressure of 10 bar. The GHSV was about 1200 l/h.

The product gas was analysed for sulphur in the gas chromatograph and the fractions of hydrogen sulphide and carbon sulphides were determined by means of the retention periods. Table 1 sums up the results. The conversion rates refer to the hydrogenation of the $CS_2$ fraction.

TABLE 1

Hydrogenation results (weight specified in %-vol. unless otherwise indicated)

|  | 1 | | 2 | | 3 | | 4 | |
| --- | --- | --- | --- | --- | --- | --- | --- | --- |
|  | Feed | Prod. | Feed | Prod. | Feed | Prod. | Feed | Prod. |
| Hydrogen | 59.0 | 59.0 | 59.0 | 59.0 | 59.0 | 59.0 | 59.0 | 59.0 |
| Methane | 27.0 | 27.0 | 27.0 | 27.0 | 27.0 | 27.0 | 27.0 | 27.0 |
| Nitrogen | 5.0 | 5.0 | 5.0 | 5.0 | 5.0 | 5.0 | 5.0 | 5.0 |
| Carbon monoxide | 6.5 | 6.5 | 6.5 | 6.5 | 6.5 | 6.5 | 6.5 | 6.5 |
| Carbon dioxide | 2.5 | 2.5 | 2.5 | 2.5 | 2.5 | 2.5 | 2.5 | 2.5 |
| COS (ppm) | 1 | 10 | 0 | 0 | 0 | 0 | 0 | 10 |
| $CS_2$ (ppm) | 117 | 0 | 94 | 0 | 95 | 0 | 54 | 0 |
| $H_2S$ (ppm) | 1 | 211 | 0 | 141 | 0 | 182 | 0 | 141 |
| Conversion rate | 95.5 | | 100 | | 100 | | 93.4 | |

The test results show that the fraction of carbon sulphides is converted to at least 95% hydrogen sulphide. At the same time the proportion of the other constituents in the coke oven gas remained constant, i.e. no methanation was observed.

The described embodiment of the invention may self-evidently also be modified in a variety of aspects without departing from the basic concept.

What is claimed is:

1. A process for the production of synthesis gas from coke, comprising the steps of:
    (a) subjecting hard coal to dry pyrolysis, resulting in the production of a gas mixture containing hydrogen, methane, nitrogen and carbon monoxide as major constituents and carbon sulphides as minor constituents;
    (b) subjecting the gas mixture to hydrogenation at a temperature in the range of 200 to 280° C. over a sulphidic cobalt molybdenum catalyst provided on an aluminium oxide carrier material; and
    (c) separating the hydrogen sulphide obtained from hydrogenation from the gas Mixture;
    wherein the sulphidic cobalt molybdenum catalyst comprises at least 50%-mole molybdenum sulphide.

2. The process of claim 1, wherein the hydrogenation of step (b) is carried out in a temperature range between 240 and 260° C.

3. The process of claim 1, wherein the hydrogenation of step (b) is carried out at a pressure of 1 to 15 bar.

4. The process of claim 3, wherein the hydrogenation of step (b) is carried out at a pressure of 5 to 10 bar.

5. The process of claim 1, wherein the hydrogenation of step (b) is carried out at a GHSV of 500 to 15001 l/h.

6. The process of claim 1, wherein cobalt molybdenum catalysts are used which do not contain any other transition metals.

7. The process of claim 1, wherein cobalt molybdenum catalysts are used which, with reference to the metal components, predominantly consist of molybdenum sulphide and contain cobalt sulphide as a promoter only.

8. The process of claim 1, wherein aluminium oxides of a high specific surface area are used as carriers for cobalt molybdenum catalysts, the aluminium oxides have:
    (i) a minimum $V_{37.4}$ of at least between 70 ml/100 g and 90 ml/100 g;
    (ii) a maximum $V_{0.1\ \mu m}$ of between 10 ml/100 g and 35 ml/100 gM;
    (iii) a maximum $V_{0.2\ \mu m}$ of between 5 ml/100 g and 25 ml/100 g; and
    (iv) a ratio of $V_{0.1\ \mu m}$ to $V_{0.2\ \mu m}$ of at least 1.5.

9. The process of claim 8, wherein the aluminium oxides have:
    (i) a minimum $V_{37.4}$ of at least 75 ml/100 g;
    (ii) a maximum $V_{0.1\ \mu m}$ of 31 ml/100 gM; and
    (iii) a maximum $V_{0.2\ \mu m}$ of 20 ml/100 g.

10. The process of claim 8, wherein the aluminium oxides have:
    (i) a minimum $V_{37.4}$ of at least 80 ml/100 g;
    (ii) a maximum $V_{0.1\ \mu m}$ of 25 ml/100 g;
    (iii) a maximum $V_{0.2\ \mu m}$ of 15 ml/100 g.

11. The process of claim 8, wherein the aluminium oxides have:
    (i) a minimum $V_{37.4}$ of at least 85 ml/100 g;
    (ii) a maximum $V_{0.1\ \mu m}$ of 15 ml/100 g;
    (iii) a maximum $V_{0.2\ \mu m}$ of 10 ml/100 g.

12. The process of claim 8, wherein the aluminium oxides have:
    (i) a minimum $V_{37.4}$ of at least 75 ml/100 g;
    (ii) a maximum $V_{0.1\ \mu m}$ of 31 ml/100 gM; and
    (iii) a maximum $V_{0.2\ \mu m}$ of 20 ml/100 g.

13. The process of claim 8, wherein the aluminium oxides have:
    (i) a minimum $V_{37.4}$ of at least 80 ml/100 g;
    (ii) a maximum $V_{0.1\ \mu m}$ of 25 ml/100 g;
    (iii) a maximum $V_{0.2\ \mu m}$ of 15 ml/100 g.

14. The process of claim 8, wherein the aluminium oxides have:
    (i) a minimum $V_{37.4}$ of at least 85 ml/100 g;
    (ii) a maximum $V_{0.1\ \mu m}$ of 15 ml/100 g;
    (iii) a maximum $V_{0.2\ \mu m}$ of 10 ml/100 g.

15. The process according of claim 1, wherein the hydrogenation of step (b) is carried out in a fixed-bed reactor.

16. The process of claim 15, wherein the catalysts used in the fixed-bed reactor are provided as one of bulk layer and packing.

17. The process of claim 16, wherein the hydrogenation product, after leaving the reactor, is passed through an absorption column, where the hydrogen sulphide is washed out with a basic liquid.

18. A method for preparing hydrogen sulphide, wherein carbon sulphides are subjected to hydrogenation in the presence of a working amount of sulphidic cobalt molybdenum catalysts provided on aluminium oxide carriers, wherein the sulphidic cobalt molybdenum catalysts comprises at least 50%-mole molybdenum sulphide.

19. The method of claim 18, wherein carbon sulphides are subjected to hydrogenation in the presence of cobalt molybdenum catalysts which, with reference to the metal components, predominantly consist of molybdenum sulphide and contain cobalt sulphide as a promoter only.

20. The method of claim 18, wherein said aluminium oxide carriers have:
   (i) a minimum $V_{37Å}$ of at least between 70 ml/100 g and 90 ml/100 g; (specific volume-ratio of volume to mass-volume occupied by mass of substance)
   (ii) a maximum $V_{0.1\ \mu m}$ of between 10 ml/100 g and 35 ml/100 gM;
   (iii) a maximum $V_{0.2\ \mu m}$ of between 5 ml/100 g and 25 ml/100 g; and
   (iv) a ratio of $V_{0.1\ \mu m}$ to $V_{0.2\ \mu m}$ of at least 1.5.

* * * * *